Feb. 23, 1960
F. J. CARSON
2,925,688
GLASS BENDING APPARATUS
Filed May 3, 1957
3 Sheets-Sheet 1
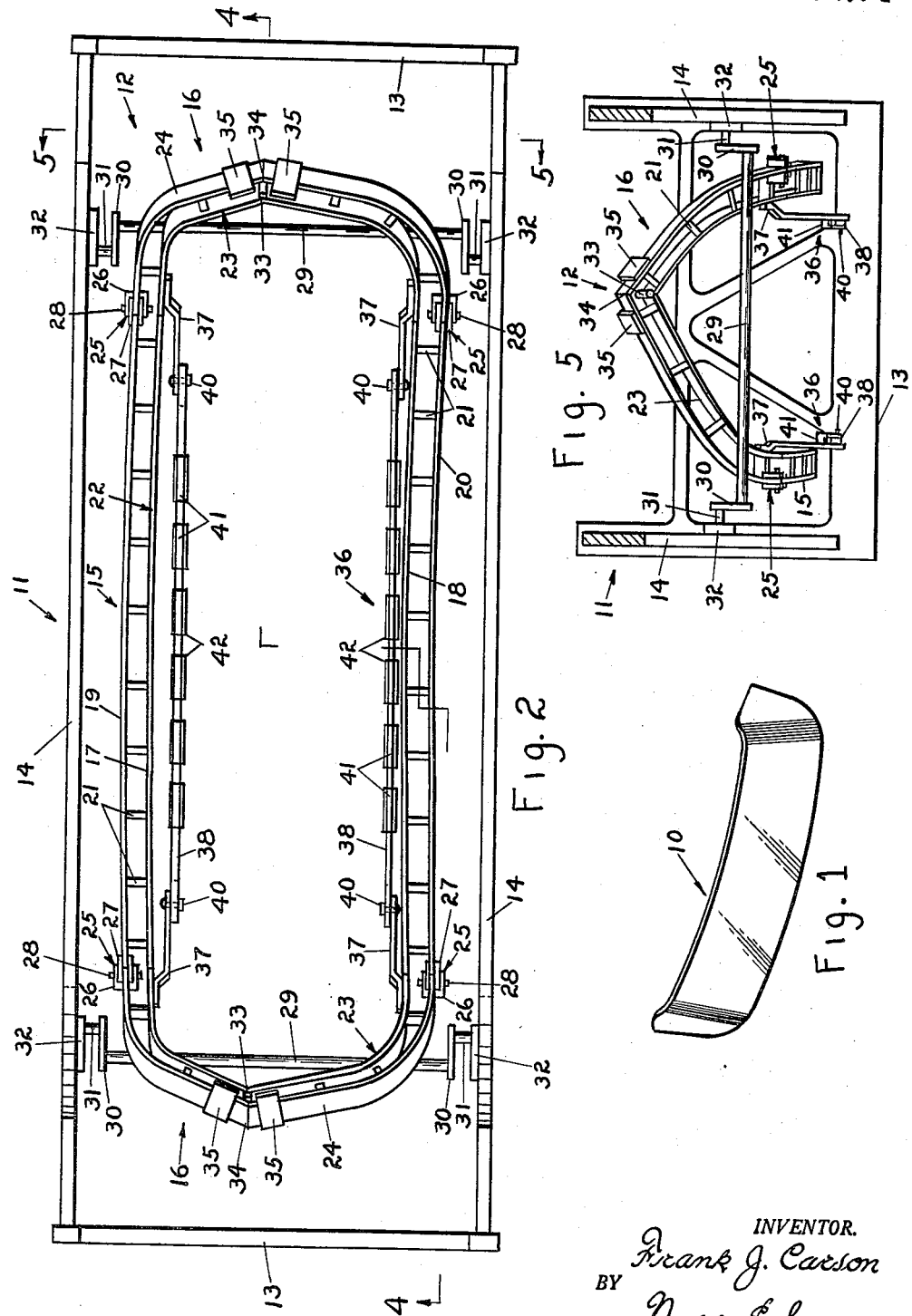
INVENTOR.
Frank J. Carson
BY
Nobbe & Swope
ATTORNEYS Feb. 23, 1960
F. J. CARSON
2,925,688
GLASS BENDING APPARATUS
Filed May 3, 1957
3 Sheets-Sheet 2
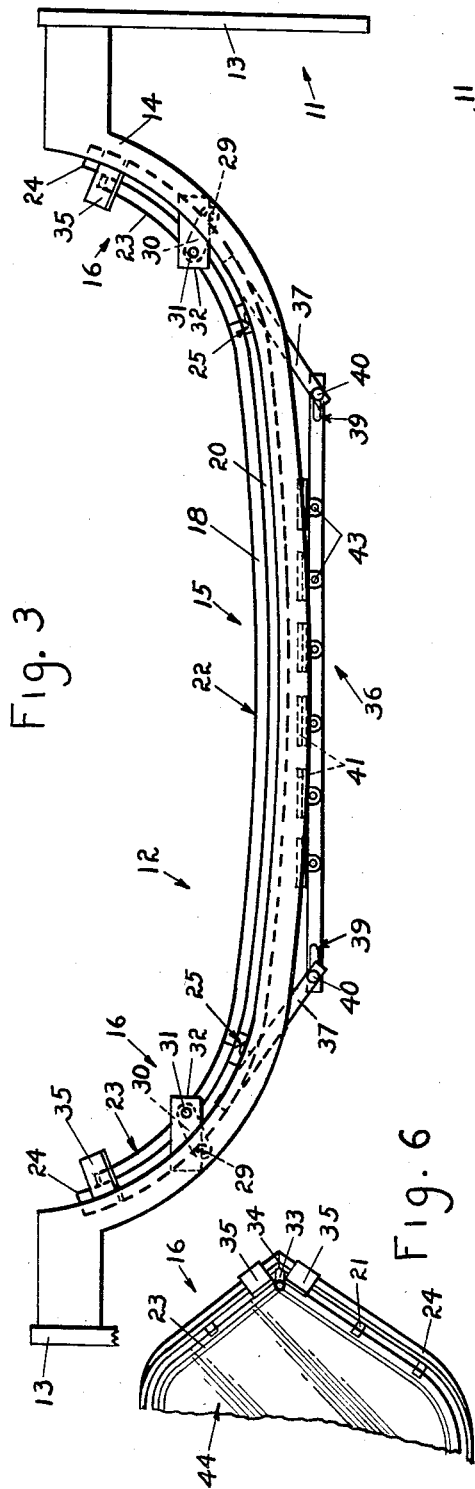
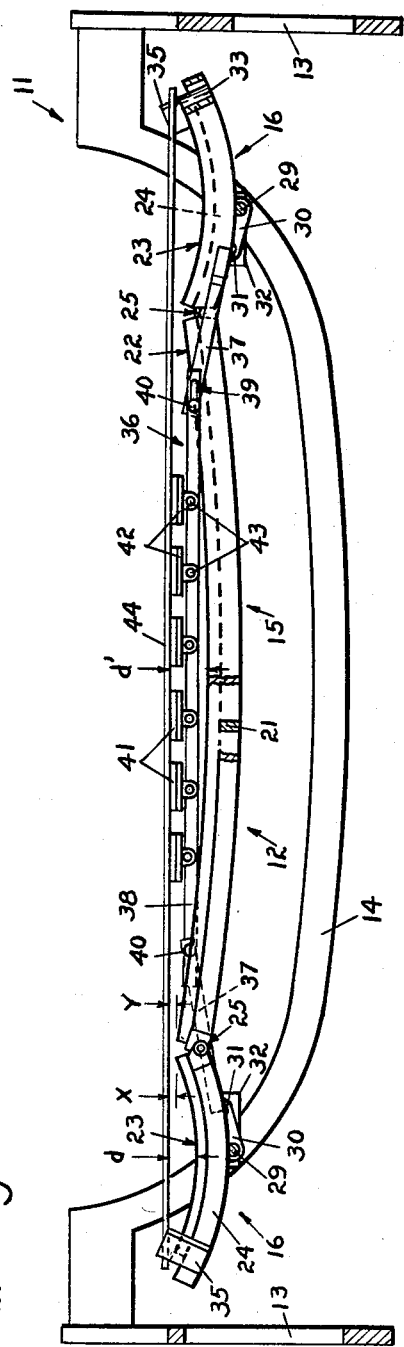
INVENTOR.
Frank J. Carson
BY
Nobbe & Swope
ATTORNEYS Feb. 23, 1960 — F. J. CARSON — 2,925,688
GLASS BENDING APPARATUS
Filed May 3, 1957 — 3 Sheets-Sheet 3
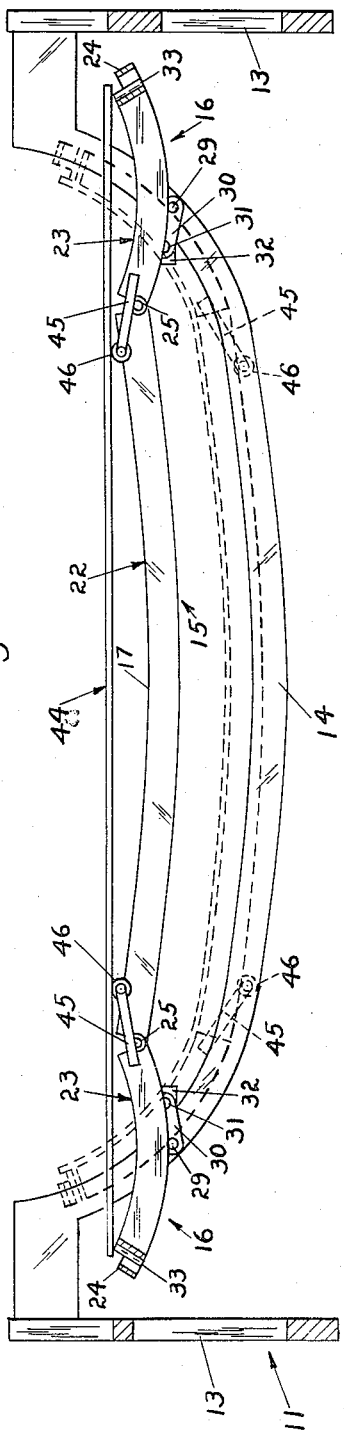
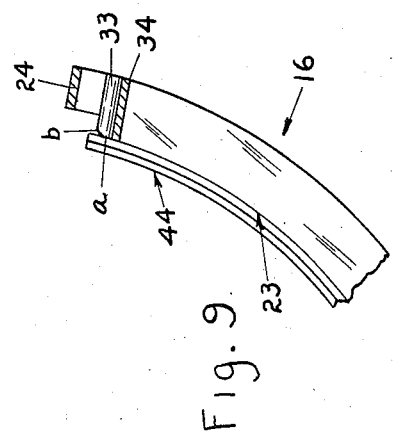
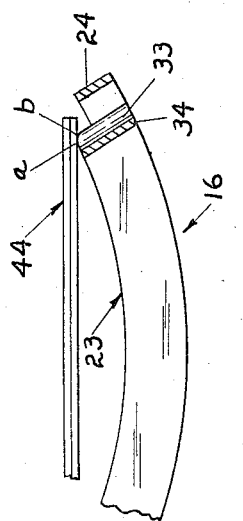
INVENTOR.
Frank J. Carson
BY Nobbe & Swope
ATTORNEYS

United States Patent Office 2,925,688
Patented Feb. 23, 1960

2,925,688

GLASS BENDING APPARATUS

Frank J. Carson, Toledo, Ohio, assignor to Libbey-Owens-Ford Glass Company, Toledo, Ohio, a corporation of Ohio Application May 3, 1957, Serial No. 656,818

3 Claims. (Cl. 49—67)

This invention relates generally to the bending of sheets or plates of glass, and more particularly to an improved multi-sectioned bending mold.

There are two generally used methods for bending glass sheets that are to be used, for example, in automobile windshields. In one of these methods, a block size sheet, which may be substantially rectangular, is bent into conformity with the shaping surface of a glass bending mold, and after the sheet is bent the desired pattern outline is then cut from the bent sheet.

In the other method, the glass sheet is first cut to the desired outline and then bent into conformity with the shaping surface of the mold. This method is commonly used when bending glass sheets which are to be subsequently tempered since a tempered sheet cannot be cut. However, this latter method of bending has certain disadvantages in that the mold oftentimes mars portions of the sheet. This difficulty is not encountered when bending block size glass sheets since the mold shaping surface engages the sheet outwardly of the outline of the patterned sheet portion to be cut therefrom.

One way of minimizing mold markings which, generally speaking, are caused by sliding engagement of the glass with respect to the bending mold, has been to support the glass sheet above the ends of the mold shaping surface prior to bending and then lowering the sheet onto the mold shaping surface. Apparatus of this general type is disclosed in U.S. Patent 2,737,758, issued March 13, 1956, to J. E. Jendrisak. However, bending molds of the type shown in the Jendrisak patent are relatively complicated and costly and have many moving parts which must, of course, be carefully designed since the mold is to be subjected to high temperatures. In accordance with the present invention, however, there is provided a bending apparatus with novel sheet support means which substantially eliminates objectionable mold markings and at the same time is relatively inexpensive as compared to prior art bending molds.

It is, therefore, an object of the present invention to provide improved glass bending apparatus.

Another object of the invention is to provide a multi-sectioned glass bending mold having improved glass sheet support means which engage a flat glass sheet at the ends thereof and support the sheet immediately above the mold shaping surface.

Another object of the invention is to provide such a bending mold with improved sheet locating means.

A further object of the invention is to provide such a bending mold with improved means for supporting the sides of the glass sheet to be bent intermediate the ends thereof.

Other objects and advantages of the invention will become more apparent during the course of the following description when taken in connection with the accompanying drawings.

In the drawings, wherein like numerals are employed to designate like parts throughout the same:

Fig. 1 is a view in perspective of a glass sheet bent on the apparatus of the present invention;

Fig. 2 is a plan view of a multiple section bending mold constructed in accordance with the invention;

Fig. 3 is a side elevation of the bending mold of Fig. 2;

Fig. 4 is a longitudinal sectional view taken along the line 4—4 of Fig. 1 and showing the mold in the open position;

Fig. 5 is a transverse sectional view taken along the line 5—5 of Fig. 1 and showing the mold in the closed position;

Fig. 6 is a fragmentary plan view of the end of the mold in open position and showing the relation of the sheet support and locating means with respect to the edge of a flat glass sheet to be bent;

Fig. 7 is a sectional view similar to Fig. 4 and showing a modified form of the invention;

Fig. 8 is an enlarged fragmentary elevation view of the sheet support means when the mold is in the open position; and Fig. 9 is a view similar to Fig. 8 when the mold is in the closed position.

With reference now to the drawings and particularly to Fig. 1 thereof, there is shown a glass sheet 10 which may be bent upon the novel bending apparatus of the present invention. Such a sheet is normally cut to the desired ultimate outline thereof prior to bending, or it may be cut to approximately such outline and then a small edge portion trimmed therefrom after being bent if the sheet is not immediately tempered after being bent.

The bending apparatus built in accordance with the invention and adapted to bend such a sheet is shown in Figs. 2 to 6 inclusive and comprises a support or rack 11, and a multi-sectioned bending mold 12 supported by said rack.

As shown in plan view in Fig. 2, the rack comprises end frames 13 and bent connecting members 14 which members, as shown in Fig. 3, conform approximately to the outline of the mold when in the closed position.

The mold 12 comprises a center section 15 and oppositely disposed substantially V-shaped or triangularly shaped end sections 16. The center mold section 15 comprises a pair of spaced shaping rails 17 and 18 secured to adjacent support rails 19 and 20 respectively by means of web members 21. As shown in Fig. 3, each of the rails 17 and 18 is of a gradual relatively shallow curvature and have their upper surfaces finished to provide a center section shaping surface generally designated by the numeral 22.

Each of the mold end sections 16 comprises a substantially V-shaped shaping rail 23 secured to a correspondingly shaped support rail 24 by means of additional web members 21.

The center mold section 15 is connected to the mold end sections 16 by means of hinged joints 25 of the construction commonly used in bending molds of this type and comprising yokes 26 formed at the innermost ends of the end section support rail 24 and interfitting abutting members 27 carried at the opposite ends of the center section support rails 19 and 20. Both the yokes and the members 27 are provided with axially aligned holes through which a hinge pin 28 may be inserted.

As shown in Figs. 3 and 4, the mold 12 is mounted upon the support rack 11 for movement from the open position of Fig. 4 in which the mold end sections 16 are spread apart and a glass sheet may be mounted on the mold, to the closed position of Fig. 3 wherein the glass sheet is bent into conformity with the closed mold sections. To support the mold for such movement, a transverse rod 29 is secured to the lowermost surface of each of the end section shaping rails 23 and has its opposite ends extending outwardly therefrom to be rotatably received in the lowermost ends of transversely aligned links 30 having their uppermost ends swingably mounted upon fixed rods 31 secured to blocks 32 carried by the rack connecting members 14.

In bending glass sheets upon a mold of this general type, the sheet being bent generally has the under surface thereof, in engagement with the end section shaping rail, somewhat marred due to the sliding engagement of this portion of the mold with the sheet due to the difference in change of curvature and rate of change between the mold sections, in moving to the closed position of Fig. 3, and the glass sheet in moving to such a position. Therefore, in accordance with the present invention, there is provided improved sheet support and locating means which, in addition to substantially eliminating undesirable mold markings, also aids materially in the bending of the sheet.

As best shown in Fig. 2, the improved sheet support and locating means comprises a sheet end support member comprising a pin 33 located immediately adjacent and in close proximity to the apex 34 of each of the end section shaping rails and fixedly secured thereto, sheet edge locating members in the form of plates 35 disposed in pairs with each pair being carried by the support rail 24 on opposite sides of and spaced outwardly from the pin 33, and intermediate sheet support means for supporting the portion of the glass sheet located above the mold center section 15 and generally designated by the numeral 36. The preferred embodiment of the invention makes use of all of the above mentioned component parts of the sheet locating and support means. However, very satisfactory bends may be made by using only the intermediate support means and the support pins. Referring now in more detail to the intermediate sheet support means 36 as shown in Figs. 2 and 4, opposed aligned arms 37 are rigidly secured to the facing surface of the lowermost ends of each of the V shaped shaping rails 23 and extend inwardly and upwardly to slidably support, adjacent their outermost ends, a longitudinally extending bar 38 provided with elongated slots 39 at its outermost ends within which are received pins 40 secured to the outermost ends of the arms 37. Secured to each of the bars 38 is a plurality of sheet engaging blocks 41 which may be formed of a suitable material, for example "Marinite" (registered trademark), which will not mar or fuse to hot glass. Each of the blocks 41 is mounted for movement in a vertical plane by means of a support 42 rotatably secured to the bar 38 by means of a pin 43. The blocks 41 contact the undersurface of a glass sheet 44 to be bent for a substantial distance along the portion thereof that is to be bent into conformity with the mold center section 15, and as shown in Fig. 2, both the arms 37 and bars 38 are located immediately adjacent but spaced slightly inwardly of the center section rail portions 17 and 18 so as to support the glass sheets adjacent the longitudinal marginal edges thereof.

Referring now to the sheet support and locating means carried by each of the mold end sections, the support pin 33 is fixedly secured to the rail 23 at the apex thereof and extends above the rail shaping surface at said apex a very limited distance. As shown in Figs. 8 and 9, the upper end of the support pin 33 has a first surface portion $a$ immediately adjacent the apex 34 of the rail 23 which has an upper surface contour which forms substantially a continuation of the shaping surface at the apex of the rail 23, and a second or connecting portion $b$ that is gently curved downwardly from said first portion and disposed at an angle thereto. In the open mold position of Fig. 8, the glass sheet when supported upon the member 33 contacts the second or angularly disposed portion $b$ thereof, and after the mold sections have moved to the closed position the end of the glass sheet has moved away from the second surface portion $b$ and is engaged by the first portion $a$.

The locating plates 35 are fixedly secured to the outermost surface of each of the triangular support bars 24 and positioned a limited distance to either side of the apex of said support bar and thus also are positioned a limited distance to either side of the pin 33 as well as being spaced outwardly therefrom.

In bending a glass sheet upon the bending apparatus of the invention, the mold sections are first moved to the open position of Fig. 4 with the links compensating for the increased length of the mold. When in the open position, the upper surfaces of the glass sheet support blocks 41 are positioned in the same plane defined by the surface portion $b$ of the pins 33. The flat sheet to be bent, and which has previously been pattern cut, is then placed upon the mold and is supported at its outermost ends by the surface portions $b$ of the pins 33, and intermediate its ends along each longitudinal marginal edge by the plurality of support blocks 41. While in this position, the end edges of the sheet are not engaged by the locator plates 35 since the length of the glass sheet to be bent, as shown in Fig. 6, is somewhat less than the longitudinal distance between the opposed pairs of locator plates 35 when the mold is in the open position.

With the sheet thus positioned, the bending apparatus is then passed into and through a suitable furnace adapted to heat the glass sheet to bending temperature. As the bending apparatus is travelling through the furnace, the glass sheet is progressively heated until it reaches a temperature at which it begins to sag at which time the bending mold, due to the weight of the mold center section, begins its movement from the open position of Fig. 4 to the closed position of Fig. 3. In so moving, the outermost ends of the mold end sections begin to rotate upwardly and inwardly and the sheet engaging portion $b$ of the pin 33 moves relative to the under surface of the glass sheet and in sliding contact therewith. Simultaneously with the upward movement of the mold end sections, the innermost ends of said end sections and the mold center section begin moving downwardly. Due to the arms 37 being connected to the mold end sections, the sheet support blocks 41 are also lowered while maintaining contact with the under surface of the glass sheet thus lowering the sheet toward the shaping surface of the mold center section. As the mold continues its closing movement, the mold end sections move upwardly and inwardly more rapidly than the corresponding portions of the glass sheet and the locator plates 35 come into bearing contact with the corresponding edge portions of the edges of the glass sheet thus automatically centering the sheet with respect to the mold so as to insure proper conformity with the mold shaping surface.

As shown in Fig. 3, when the mold has moved to the completely closed position the sheet support blocks 41 have been moved to a position below the shaping surface of the mold center section. The length of the arms 37 and the slope thereof is proportioned so that the blocks 41 move below the center mold section shaping surface immediately prior to the final closing movement of the mold thus depositing the central portion of the sheet on the mold.

It was previously mentioned that satisfactory bends may be made without using the edge locator plates 35. It will be readily understood from the foregoing description that the primary purpose of these plates is merely to transversely locate the sheet with respect to the mold shaping surface and that, in fact, the plates do not bear against the glass sheet until the sheet is partially bent. Therefore, if desired these plates may be eliminated if the tolerances for the bent sheet are not too rigid.

As also previously mentioned, the sheet engaging portion of the pin 33 moves inwardly in sliding contact with the under surface of the glass sheet during the closing action of the mold. However, due to the gradual curvature of the surface portion $b$ of the pin, only a very limited area on the under surface of the sheet is engaged at any one time. Furthermore, as the upper ends of the mold end section continue their upwardly and inwardly rotative movement, the glass sheet is sagging downwardly at the same time and, in effect, pivoting about and in contact with the surface portion $b$ so that as the mold reaches the final closed position, the end of the glass sheet as shown in Fig. 9 has pivoted free of the portion $b$ of the pin 33 and is engaged by the sheet portion $a$ of said pin. Due to the novel design of the sheet engaging surface of the pin, only a relatively small area of the sheet is engaged thereby, and although some sliding movement takes place, the contoured upper or sheet engaging surface of the pin greatly minimizes the effects of this surface on the glass sheet. Therefore, greatly improved results are achieved as compared to the bending molds of the prior art and not provided with such support means since in such molds the glass sheet would be bearing directly upon the shaping surface of the mold end sections which would afford substantial contact to the sheet over a much greater area and thus greatly increase the area of the sheet having mold markings thereon as well as the severity of these markings.

The control of the bend produced in accordance with the present invention is very greatly aided by the fact that the glass sheet is supported relatively low with respect to the bending mold while in the open position. It will be readily understood that the particular curvature of the shaping rails is naturally dependent upon the type of bend to be produced. However, by properly locating the position of the hinges 25, the glass sheet can be maintained relatively low with respect to the shaping rail section while in the open mold position of Fig. 4. More specifically, if the hinges were located inwardly of their position shown in Fig. 4, it is readily apparent that the outermost ends of the triangularly shaped end section shaping rails 23 would be at a considerably higher elevation than the innermost ends thereof and also higher than the opposite ends of the center section rails 17 and 18. However, by properly locating the hinges, the outer and innermost ends of the triangular rail sections 23 and the opposite ends of the center rail sections 17 and 18 can be maintained in substantially the same plane and thus the flat glass sheet may be positioned relatively close to the shaping rail sections when the mold is in the open position. It has been found that very satisfactory bends are produced when the distance $x$ from the shaping surface at the innermost ends of the triangular rails 23 to the lower surface of the glass sheet is maintained at less than about ½ inch, best results were achieved when the glass sheet was spaced in very close proximity to, but out of contact with, the shaping surface at the ends of the triangular shaping rail. The same criteria also apply with respect to the distance $y$ from the under surface of the glass sheet to the shaping surface at the outermost ends of the center rail sections 17 and 18. Preferably the distance from the undersurface of the glass sheet to the inner ends of the triangularly shaped shaping rail sections or the outermost ends of the center shaping rail sections is less than the depth of curvature $d$ or $d'$ respectively of these sections. As shown in Fig. 4, the ratio of the distance $d'$ to the distance $y$ is approximately 3 to 1.

The modified form of mold shown in Fig. 7 is substantially identical to the mold shown in Figs. 2 to 5 except for the intermediate sheet support means which comprises a pair of transversely aligned sheet engaging arms 45 secured to each of the end section shaping rails, adjacent the inner ends thereof, and extend inwardly and upwardly therefrom to engage the under surface of the glass sheet when the mold is in the open position. Each of the arms 45 is provided with a rotatable ceramic roller 46 at its uppermost end for engaging the glass sheet, and the length and slope of each arm is proportioned so that in the closed mold position, shown in phantom lines, the roller 46 is positioned beneath the mold shaping surface.

It is to be understood that the forms of the invention herewith shown and described are to be taken as preferred embodiments of the same, and various changes may be resorted to without departing from the spirit of the invention or the scope of the subjoined claims.

I claim:

1. In apparatus for bending glass sheets, a bending mold comprising a plurality of mold sections including a movable mold section forming an end of said bending mold and movable from an open position to a closed position, said movable mold section comprising a curved upstanding shaping rail having a shaping surface formed thereon for receiving a glass sheet to be bent in contact therewith, sheet support means carried by said movable mold section and mounted immediately adjacent said rail and extending upwardly thereabove, said sheet support means comprising a pin having a first surface portion immediately adjacent the shaping surface forming substantially a continuation of said shaping surface and a second surface portion curved downwardly from said first surface portion and disposed at an angle thereto for receiving the undersurface of a glass sheet in contact therewith prior to bending of said sheet, and sheet support members carried by said movable mold section, each of said members having a sheet contacting portion engageable with a portion of the glass sheet spaced inwardly from the opposite ends thereof prior to the bending of said sheet, the sheet contacting portions of said sheet support members being substantially in the same plane as the second surface portion of said pin when said mold is in the open position.

2. In combination with a glass bending mold comprising a plurality of mold sections movable from an open position to a closed position and having a shaping surface which conforms in elevation and curvature to the configuration of a bent glass sheet when the mold is in the closed position, said mold having a center section and substantially triangularly shaped end sections pivotally connected to and mounted for relative movement with respect to said center section, a frame, pivoted members connecting said end sections to said frame, means for supporting an extremity of a flat glass sheet mounted for bending on said mold, said means comprising a pin connected to said mold at the apex of each of the triangularly shaped end sections, said pin having a first surface portion immediately adjacent the shaping surface forming substantially a continuation thereof for supporting the ends of said sheet when the mold sections are in closed position and a second surface portion curved downwardly from said first surface portion and disposed at an angle thereto for receiving the undersurface of a glass sheet in contact therewith when the mold is in the open position, sheet support members engageable with a portion of the glass sheet spaced inwardly from the opposite ends thereof prior to the bending of said sheet, and means connecting said end sections to said sheet support members for moving said end sections to closed position by the downward movement of said sheet support members.

3. In combination with a glass bending mold comprising a plurality of mold sections movable from an open position to a closed position and having a shaping surface which conforms in elevation and curvature to the configuration of a bent glass sheet when the mold is in the closed position, said mold having a center section and end sections connected to and mounted for relative movement with respect to said center section, a frame, pivoted members connecting said end sections to said frame, first sheet engaging means on each of said end sections for supporting an extremity of a flat glass sheet mounted for bending on said mold, said first sheet engaging means comprising a pin connected to the extreme outermost end of said mold, said pin having a first surface portion and a second surface portion disposed at an angle thereto for receiving the undersurface of a glass sheet in contact therewith prior to bending of said sheet, said first surface portion being immediately adjacent the shaping surface and forming substantially a continuation thereof, said second surface portion being curved downwardly and outwardly from said first surface portion, and vertically movable second sheet engaging means for supporting the central portion of the flat glass sheet connected to said end sections and movable therewith, said sheet engaging means acting in conjunction with said pins for supporting said glass sheet, said end sections being moved to closed position by the downward movement of said sheet support means.

References Cited in the file of this patent

UNITED STATES PATENTS

| | | |
|---|---|---|
| 760,959 | Connington | May 24, 1904 |
| 1,999,558 | Black | Apr. 30, 1935 |
| 2,261,023 | Galey | Oct. 28, 1941 |
| 2,518,951 | Smith | Aug. 15, 1950 |
| 2,608,030 | Jendrisak | Aug. 26, 1952 |
| 2,608,799 | Babcock | Sept. 2, 1952 |
| 2,736,140 | Black | Feb. 28, 1956 |
| 2,737,758 | Jendrisak | Mar. 13, 1956 |
| 2,827,734 | McKelvey | Mar. 25, 1958 |

FOREIGN PATENTS

| | | |
|---|---|---|
| 1,097,088 | France | Feb. 9, 1955 |
| 745,992 | Great Britain | Mar. 7, 1956 |
| 203,334 | Australia | May 31, 1956 |